United States Patent
Lee

(10) Patent No.: US 9,854,299 B2
(45) Date of Patent: Dec. 26, 2017

(54) IMAGE DISPLAY DEVICE AND OPERATION METHOD THEREOF

(71) Applicant: LG ELECTRONICS INC., Seoul (KR)

(72) Inventor: Jaekyung Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 14/914,530

(22) PCT Filed: May 28, 2014

(86) PCT No.: PCT/KR2014/004755
§ 371 (c)(1),
(2) Date: Feb. 25, 2016

(87) PCT Pub. No.: WO2015/030347
PCT Pub. Date: Mar. 5, 2015

(65) Prior Publication Data
US 2016/0205438 A1 Jul. 14, 2016

(30) Foreign Application Priority Data
Aug. 30, 2013 (KR) .......................... 10-2013-0103781

(51) Int. Cl.
*H04N 21/436* (2011.01)
*H04N 21/258* (2011.01)
(Continued)

(52) U.S. Cl.
CPC . *H04N 21/43615* (2013.01); *H04N 21/25891* (2013.01); *H04N 21/2747* (2013.01);
(Continued)

(58) Field of Classification Search
CPC ....... H04N 21/43615; H04N 21/44204; H04N 21/25891; H04N 21/4668; H04N 21/4826;
(Continued)

(56) References Cited

U.S. PATENT DOCUMENTS

| 8,185,597 B1* | 5/2012 | Cumberbatch | G06Q 40/00 709/204 |
| 2006/0020973 A1* | 1/2006 | Hannum | H04N 5/44543 725/46 |

(Continued)

FOREIGN PATENT DOCUMENTS

| KR | 10-2010-0096975 A | 9/2010 |
| KR | 10-2013-0076977 A | 7/2013 |

(Continued)

*Primary Examiner* — Chenea Smith
(74) *Attorney, Agent, or Firm* — Birch, Stewart, Kolasch & Birch, LLP

(57) ABSTRACT

An operation method of an image display device used by users according to an embodiment of the present invention comprises the steps of: receiving user data of a user and user data of at least one user group; collecting viewing history information of the user and viewing history information of the at least one user group; extracting a plurality of user viewing patterns using the user data and the viewing history information; and providing a referral program corresponding to a user viewing pattern of a highest priority on a basis of priorities of the extracted user viewing patterns, wherein the user group includes at least two users among the plurality of users.

14 Claims, 6 Drawing Sheets

(51) Int. Cl.
*H04N 21/442* (2011.01)
*H04N 21/466* (2011.01)
*H04N 21/482* (2011.01)
*H04N 21/2747* (2011.01)
*H04N 21/4223* (2011.01)
*H04N 21/431* (2011.01)
*H04N 21/45* (2011.01)
*H04N 21/434* (2011.01)
*H04N 21/485* (2011.01)

(52) U.S. Cl.
CPC ..... *H04N 21/4223* (2013.01); *H04N 21/4316* (2013.01); *H04N 21/44204* (2013.01); *H04N 21/44218* (2013.01); *H04N 21/44222* (2013.01); *H04N 21/4532* (2013.01); *H04N 21/4661* (2013.01); *H04N 21/4668* (2013.01); *H04N 21/4826* (2013.01); *H04N 21/4345* (2013.01); *H04N 21/485* (2013.01)

(58) Field of Classification Search
CPC ........... H04N 21/4661; H04N 21/2747; H04N 21/4223; H04N 21/4316; H04N 21/44218; H04N 21/44222; H04N 21/4532; H04N 21/4345; H04N 21/485
See application file for complete search history.

(56) References Cited

U.S. PATENT DOCUMENTS

| | | | |
|---|---|---|---|
| 2006/0282856 A1* | 12/2006 | Errico | G06F 17/30035 725/46 |
| 2008/0046930 A1* | 2/2008 | Smith | H04N 7/163 725/46 |
| 2009/0083803 A1* | 3/2009 | Alshaykh | H04N 21/4126 725/62 |
| 2011/0107381 A1* | 5/2011 | Solnik | G06Q 30/0251 725/93 |
| 2012/0124456 A1 | 5/2012 | Perez et al. | |
| 2013/0188021 A1 | 7/2013 | Sim | |
| 2014/0379477 A1* | 12/2014 | Sheinfeld | G06Q 30/0251 705/14.58 |

FOREIGN PATENT DOCUMENTS

| | | |
|---|---|---|
| KR | 10-2013-0085784 A | 7/2013 |
| KR | 10-2013-0090042 A | 8/2013 |
| WO | WO 2012/087825 A1 | 6/2012 |

\* cited by examiner

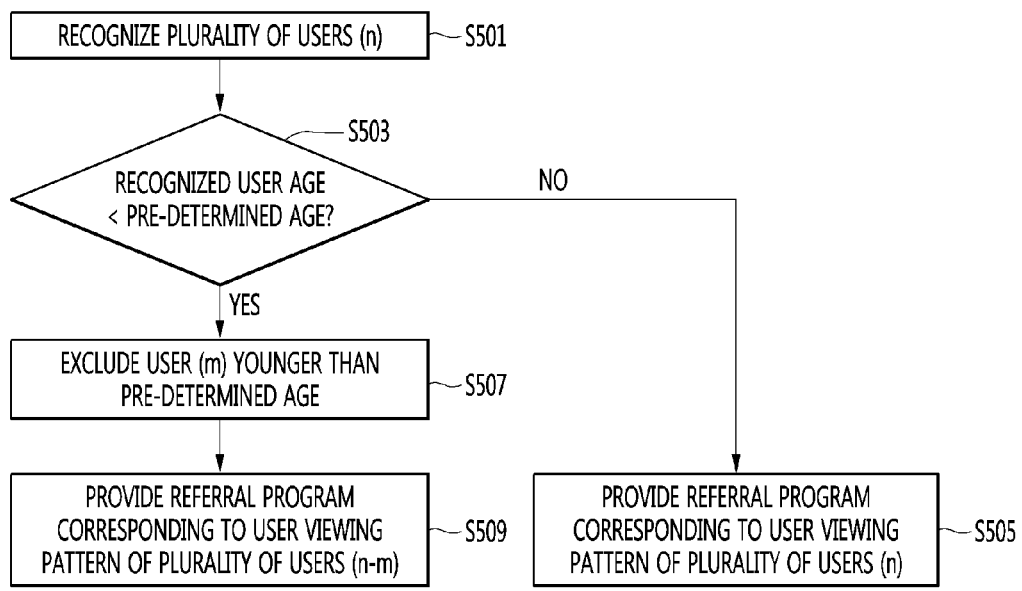
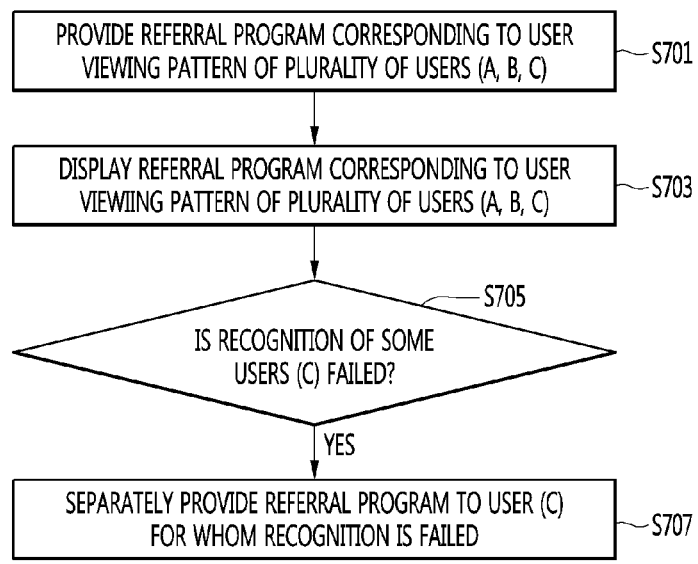

IMAGE DISPLAY DEVICE AND OPERATION METHOD THEREOF

CROSS REFERENCE TO RELATED APPLICATIONS

This application is the National Phase of PCT International Application No. PCT/KR2014/004755, filed on May 28, 2014, which claims priority under 35 U.S.C. 119(a) to Patent Application No. 10-2013-0103781, filed in Republic of Korea on Aug. 30, 2013, all of which are hereby expressly incorporated by reference into the present application.

TECHNICAL FIELD

The present disclosure relates to an image display device and an operation method thereof, and more particularly, to an image display device and an operation method thereof which provide content or setting suitable for a plurality of users.

BACKGROUND ART

Recently, digital TV services using a wired or wireless communication network are being generalized. Digital TV services may provide various services, which have not been provided in existing analog broadcast services.

In particular, as an amount of TV program content provided through internet protocol television (IPTV) or smart TV, etc., and an amount of web content are rapidly increased, technology for recommending TV program content preferred by TV viewers and technology for recommending web content preferred by web content users are being developed.

For example, there is customized TV program content recommendation technology for recommending TV program content preferred by each user through analyzing TV program viewing record data of the user and inferring preference for TV program content.

Furthermore, in view of properties of a fixed device of TV, it is necessary to develop technology for independently analyzing TV program viewing record data of a plurality of limited users, for example, a plurality of family members, from the TV program viewing record data for each user, inferring preferences for TV program content viewed by a plurality of users, and recommending preferred TV program content suitable for the plurality of users.

SUMMARY OF THE INVENTION

Embodiments provide an image display device capable of recommending content or setting suitable for a plurality of users and an operation method thereof.

In one embodiment, an operation method of an image display device used by plurality of users is provided. The operation method includes: receiving user data of a user and user data of at least one user group; collecting viewing history information for the user and viewing history information for the at least one user group; extracting a plurality of user viewing patterns by using the user data and the viewing history information; and providing a referral program corresponding to a user viewing pattern of a highest priority on a basis of priorities of the plurality of extracted user viewing patterns, wherein the user group comprises at least two of the plurality of users.

In another embodiment, an image display device used by a plurality of users is provided. The image display device includes: a camera capturing a user image; a user interface unit; and a control unit receiving user data of a user and user data of at least one user group from the camera and the user interface unit, collecting viewing history information for the user and viewing history information for the at least one user group, extracting a plurality of user viewing patterns by using the user data and the user viewing information, and providing a referral program corresponding to a user viewing pattern of a highest priority among the plurality of user viewing patterns, wherein the user group comprises at least two of the plurality of users, and the user interface unit receives a user ID, a user age, a user gender, and information on another terminal possessed by the user.

An image display device according to embodiments may improve use convenience and service utility by recommending content or setting suitable for a plurality of users.

BRIEF DESCRIPTION OF THE DRAWINGS

FIG. 5 is a flowchart illustrating a method for providing a referral program according to user recognition by an image display device according to an embodiment.

FIG. 6 is a flowchart illustrating a method for providing a referral program according to user recognition by an image display device according to an embodiment.

DETAILED DESCRIPTION OF THE EMBODIMENTS

Hereinafter, an image display device and an operation method thereof according to embodiments will now be described in detail with reference to the accompanying drawings.

For example, as an intelligent image display device in which a computer supporting function is added to a broadcast reception function, an image display device according to an embodiment, in which the internet function is added to the broadcast reception function, may be equipped with an interface, which is convenient for use such as a handwriting-type input device, a touch screen, or a spatial remote controller. In addition, the image display device is connected to the Internet or a computer under a support of a wired or wireless internet function and is capable of performing functions of email, web browsing, banking, or game, etc. For such various functions, a standardized general purpose OS may be used.

Accordingly, an image display device described herein may perform various user-friendly functions, since various applications are freely added to or removed from, for example, a general purpose OS kernel. On the other hand, an image display device described herein may be, for example, a network TV, an HBBTV, or a smart TV, etc. and also be applicable to a smart phone in some cases.

The present disclosure will now be fully described hereinafter with reference to the accompanying drawings. This disclosure may, however, be embodied in many different forms and should not be construed as being limited to the embodiments set forth herein.

Although terminologies used in the present specification are selected from general terminologies used currently and widely in consideration of functions, they may be changed in accordance with intentions of technicians engaged in the corresponding fields, customs, advents of new technologies and the like. Occasionally, some terminologies may be arbitrarily selected by the applicant. In this case, the meanings of the arbitrarily selected terminologies shall be defined in the relevant part of the detailed description. Therefore, terminologies used in the specification are to be construed based on the substantial meanings of the corresponding terminologies and the overall matters disclosed in the specification rather than construed as simple names of the terminologies.

Figure 1:
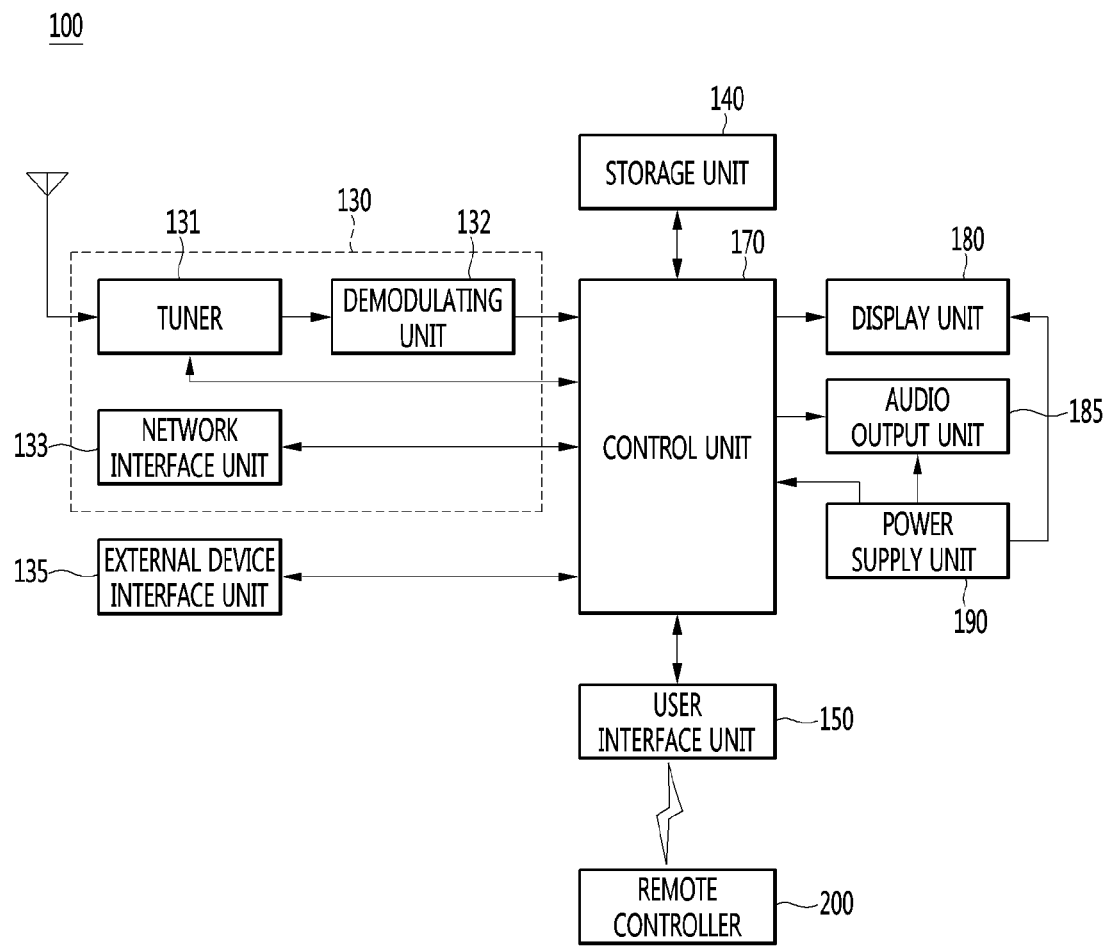
FIG. 1 is a block diagram illustrating a configuration of an image display device according to an embodiment.

FIG. 1 is a block diagram illustrating a configuration of an image display device according to an embodiment.

Referring to FIG. 1, an image display device 100 may include a broadcast reception unit 130, an external device interface unit 135, a storage unit 140, a user interface unit 150, a control unit 170, a display unit 180, an audio output unit 185, and a power supply unit 190. Furthermore, the broadcast reception unit 130 may include a tuner 131, a demodulating unit 132, and a network interface unit 133.

The tuner 131 selects a radio frequency (RF) broadcast signal corresponding to a channel selected by a user among RF broadcast signals received through an antenna, or an RF broadcast signal corresponding to all pre-stored channels, and converts the selected RF broadcast signal into an intermediate frequency (IF) signal or a baseband image/voice signal.

For example, when the selected RF broadcast signal is a digital broadcast signal, the tuner 131 may convert the RF broadcast signal into a digital IF signal, and in a case of an analog signal, the tuner 131 may convert the RF broadcast signal into an analog baseband image or voice signal (CVBS/SIF).

In other words, the tuner 131 may process both the digital broadcast signal or the analog broadcast signal, and the analog baseband image or voice signal (CVBS/SIF) output from the tuner 131 may be directly input to the control unit 170.

In addition, the tuner 131 may receive an RF broadcast signal with a single carrier according to an advance television systems committee (ATSC) scheme or an RF broadcast signal with a plurality of carriers according to a digital video broadcasting (DVB) scheme.

On the other hand, the tuner 131 may sequentially select RF broadcast signals of all broadcast channels stored through a channel storing function from among RF broadcast signals received through an antenna and may convert the selected RF broadcast signals into intermediate frequency signals, or baseband images or voice signals.

The demodulating unit 132 may receive the digital IF signal (DIF) converted by the tuner 131 to perform demodulation. For example, the digital IF signal output from the tuner 131 is of an ATSC scheme, the demodulating unit 132 may perform 8-vestigal side band (8-VSB) demodulation.

In addition, the demodulating unit 132 may perform channel decoding and to this end, may include a Trellis decoder, de-interleaver, and a Reed-Solomon decoder to perform Trellis decoding, de-interleaving, and Reed-Solomon decoding.

For example, the digital IF signal output from the tuner 131 is in a DVB scheme, the demodulating unit 132 may perform coded orthogonal frequency division modulation (COFDMA) demodulation.

In addition, the demodulating unit 132 may perform channel decoding and to this end, may include a convolution decoder, a de-interleaver, and a Reed-Solomon decoder to perform convolution decoding, de-interleaving and Reed-Solomon decoding.

The demodulating unit 132 may output a stream signal (TS) after performing demodulation and channel decoding, and the stream signal may be a signal in which an image signal, a voice signal, or a data signal are multiplexed.

For example, the stream signal may be an MPEG-2 transport stream (TS) in which an image signal of an MPEG-2 specification and a voice signal of a Dolby AC-3 specification are multiplexed. In detail, the MPEG-2 TS may include a 4 byte header and a 184 byte payload.

The header includes information for informing a signal start and a packet identifier (PID) for a signal carried in the payload, and the payload includes an image, audio and EPG information for each channel. The EPG information may include a system time table (STT) by a program and system information protocol (PSIP), a master guide table (MGT), a virtual channel table (VCT), a rating region table (RRT), and an event information table (EIT).

Furthermore, the demodulating unit 132 may separately include an ATSC demodulating unit and a DVB demodulating unit according to the ATSC and DVB schemes.

The stream signal output from the demodulating unit 132 may be input to the control unit 170, and the control unit 170 may perform demultiplexing and image/voice signal processing, and may output an image to the display unit 180 and a voice to the audio output unit 184.

The external device interface unit 135 may connect an external device and the image display device 100, and to this end, may include an A/V input/output unit (not illustrated) or a wireless communication unit (not illustrated).

The external device interface unit 135 may be connected in a wired/wireless manner to the external device such as a digital versatile disk, Blu-ray disc, game device, camera, camcorder, or computer (e.g. notebook computer).

In addition, the external device interface unit 135 may deliver an image, voice, or data signal input through the connected external device to the control unit 170 of the image display device 100 and may output an image, voice, or data signal processed in the control unit 170 to the connected external device.

The A/V input/output unit (not illustrated) may include a USB terminal, a composite video banking sync (CVBS) terminal, a component terminal, an S-video terminal (analog), a digital visual interface (DVI) terminal, a high definition multimedia interface (HDM) terminal, an RGB terminal, and a D-SUB terminal.

Furthermore, the wireless communication unit (not illustrated) may perform short-range wireless communication with other electronic devices. For example, the image display device 100 may be connected to other electronic device according to a communication specification such as Bluetooth, radio frequency identification (RFID), infrared data association (IrDA), ultra wideband (UWB), ZigBee, or digital living network alliance (DLNA).

In addition, the external signal input unit 135 may be connected to various set top boxes through at least one of the foregoing various terminals and may perform an input/output operation with the set top boxes.

On the other hand, the external device interface unit 135 may receive an application or an application list inside an adjacent external device and may deliver the application or the application list to the control unit 170 or the storage unit 140.

The network interface unit 133 may provide an interface for connecting the image display device 100 to wired/wireless networks including an internet network. For example, the network interface unit 133 may include an Ethernet terminal for connecting to a wired network and may be connected to a wireless network by using a communication specification such as wireless LAN (WLAN), wireless broadband (Wibro), world interoperability for microwave access (WiMAX), high speed downlink packet access (HSDPA).

Furthermore, the network interface unit 133 may transmit or receive data with other users or other electronic devices through a connected network or another network linked to the connected network.

In addition, content data stored in the image display device 100 may be transmitted to a user or an electronic device selected among other users or other electronic devices pre-registered to the image display device 100.

The network interface unit 133 may be connected to a predetermined web page through the connected network or another network linked to the connected network. In other words, the network interface unit 133 may be connected to the predetermined web page through the network to transmit or receive data to or from a corresponding server.

In addition, the network interface unit 133 may receive content or data provided by a content provider or a network operator. In other words, the network interface unit 133 may receive content such as a movie, advertisement, game, VOD, or broadcast signal and information related thereto, which are provided from the content provider or network operator through the network.

In addition, the network interface unit 133 may receive firmware update information or update files provided by the network operator and may transmit data to the internet or content provider, or the network operator.

The network interface unit 133 may select and receive a desired application from among applications opened to the public through the network.

The storage unit 140 may store a program for processing and controlling each signal inside the control unit 170 and store the processed image, voice, or data signal.

In addition, the storage unit 140 may perform a function for temporary image, voice, or data signal input from the external device interface unit 135 or the network interface unit 133, or may store information related to a predetermined broadcast channel through a channel memory function.

The storage unit 140 may store an application or an application list input from the external device interface unit 135 or the network interface unit 133.

The storage unit 140 may include at least one type of storage media including a flash memory type, a hard disk type, a multimedia card micro type, a card type memory (e.g. SD or XD memory), RAM, and ROM (e.g. EEPROM).

The image display device 100 may play content files (video files, still image files, music files, document files, or application files, etc.) stored in the storage unit 140, and may provide them to the user.

The user interface, unit 150 may deliver an input signal from the user to the control unit 170 or a signal from the control unit 170 to the user. For example, the interface unit 150 may receive and process user input signals such as a power on/off signal, a channel selection signal, or a screen setting signal from the remote controller 200 according to various communication schemes such as an RF communication scheme, or IR communication scheme, or may process and transmit a signal from the control unit 170 to the remote controller 200.

In addition, the user interface unit 150 may deliver a control signal input through a local key (not illustrated) such as a power key, channel key, volume key, or setting key, to the control unit 170.

On the other hand, the user interface unit 150 may deliver a control signal input from a sensing unit (not illustrated), which senses a user gesture, to the control unit 170 or may transmit a signal from the control unit 170 to the sensing unit (not illustrated). Furthermore, the sensing unit (not illustrated) may include a touch sensor, a voice sensor, a position sensor, or a motion sensor, etc.

The control unit 170 may demultiplex a stream input from the tuner 131, the demodulating unit 132, or the external device interface unit 135, or may process the demultiplexed signals to generate and output signals for an image or voice output.

The image signal processed in the control unit 170 is input to the display unit 180 to be displayed as an image, which corresponds to the image signal. In addition, the image signal processed in the control unit 170 may be input to an external output device through the external device interface unit 135.

The voice signal processed in the control unit 170 may be output to the audio output unit 185. In addition, the voice signal processed in the control unit 170 may be input to an external output device through the external device interface unit 135.

Besides, the control unit 170 may control an overall operation inside the image display device 100. For example, the control unit 170 may control the tuner 131 to enable RF broadcast corresponding to a channel selected by a user or a pre-stored channel to be tuned.

In addition, the control unit 170 may control the image display device 100 by using a user command or an internal program input through the user interface unit 150, and may access a network and download an application desired by a user or an application list to the image display device 100.

For example, the control unit 170 may control the tuner 131 to allow a signal selected according to a predetermined channel selection command, which is received through the user interface unit 150, to be input, and may process an image, voice, or data signal of the selected channel.

The control unit 170 may allow channel information selected by a user to be output together with the processed image or voice signal through the display unit 180 or the audio output unit 185.

In addition, the control unit 170 may output, through the display unit 180 or the audio output unit 185, an image signal or a voice signal input from an external device, for example, a camera or a camcorder, through the external device interface unit 135 according to an external device image playback command received through the user interface unit 150.

Furthermore, the control unit 170 may control the display unit 180 to display an image, and may control, for example, a broadcast image input through the tuner 131, an external input image input through the external device interface unit 135, an image input through a network interface unit, or an image stored in the storage unit 140, to be displayed on the display unit 180. In this case, the image displayed on the display unit 180 may be a still image or a video, and may be a 2D or 3D image.

In addition, the control unit 170 may control content stored in the image display device 100, received broadcast content, or external input content input from an outside to be played, and the content may have various types such as a broadcast image, external input image, audio file, still image, connected web screen, and document file.

On the other hand, although not illustrated in FIG. 1, the image display device 100 may further include a channel browsing process unit for generating a thumbnail image, which corresponds to a channel signal or an external input signal.

The channel browsing processing unit may receive a stream signal TS output from the demodulating unit 132 or a stream signal output from the external device interface unit 135, and may extract an image from the input stream signal to generate the thumbnail image.

The generated thumbnail image may be input as it is or may be encoded and input to the control unit 170, or is also possible to be encoded in a stream type and input to the control unit 170.

The control unit 170 may display a thumbnail list including a plurality of thumbnail images on the display unit 180 by using the input thumbnail image, and the thumbnail images in the thumbnail list may be updated sequentially or simultaneously. Accordingly, the user may conveniently know content of a plurality of broadcast channels.

The display unit 180 may convert an image signal, data signal, or OSD signal processed in the control unit 170, or an image signal or data signal received from the external device interface unit 135 into R, G, and B signals to generate a driving signal.

To this end, the display unit 180 may use a PDP, an LCD, an OLED, a flexible display, or a 3D display, etc., or may also be configured with a touch screen to be used as an input device besides an output device.

The audio output unit 185 may receive a signal, for example, a 3.1 channel signal or a 5.1 channel signal, which is voice-processed in the control unit 170, and output the signal as a voice, and may be realized with various types of speakers.

On the other hand, the image display device 100 may further include a capturing unit (not illustrated) for obtaining an image of a user, and image information obtained by the capturing unit (not illustrated) may be input to the control unit 170.

In this case, the control unit 170 may sense user gestures from or by combining each of images captured by the capturing unit (not illustrated) or signals sensed by the sensing unit (not illustrated).

The power supply unit 190 may supply corresponding power to the entire image display device 100, and may supply power to the control unit 170, the display unit 180, and the audio output unit 185, which may be realized in, for example, a system on chip (SOC) type.

To this end, the power supply unit 190 may include a converter (not illustrated) for converting AC power to DC power, and may further include an inverter (not illustrated) in which a PWM operation is possible for brightness variation or dimming driving, when the display unit 180 is realized with a liquid crystal panel that includes a plurality of backlight lamps.

The remote controller 200 transmits a user input to the user interface unit 150. To this end, the remote controller 200 may use Bluetooth, radio frequency (RF) communication, infrared (IR) communication, UWB, or ZigBee scheme, etc.

In addition, the remote controller 200 may receive the image, voice, or data signal output from the user interface 150, and may display the received image, voice, or data signal thereon or output a voice or vibration.

The image display device 100 is a fixed type and may be a digital broadcast receiver capable of receiving at least one of digital broadcast in an ATSC scheme (i.e. 8-VSB scheme), digital broadcast in a DVB-T scheme (i.e. COFDM scheme), digital broadcast in an ISDB-T scheme (i.e. BST-OFDM scheme).

On the other hand, since the image display device 100 illustrated in FIG. 1, a part of illustrated elements may be integrated, added or omitted according to specifications of the image display device 100, which is actually realized.

In other words, two or more elements may be integrated into one element or one element may be divided into two or more elements as necessary. In addition, a function performed by each block is to explain an embodiment and detailed operations and devices thereof do not limit the scope of the present disclosure.

According to another embodiment, unlike that illustrated in FIG. 1, the image display device 100 does not include the tuner 131 and the demodulating unit 132, and may receive an image through the network interface unit 133 or the external device interface unit 135 and may play the image.

For example, the image display device 100 may be implemented in a divided manner into an image processing device such as a set-top box for receiving broadcast signals or content according to various network services and a content playback device for playing content, which is input from the image processing device.

In this, case, a method for providing content or settings suitable for a plurality of users according to an embodiment, which will be described below, may be performed not only by the image display device 100 as described in relation to FIG. 1, but also by either the image processing device such as the set-top box or the content playback device that includes a display unit 180 and an audio output unit 185, as described above.

Figure 2:
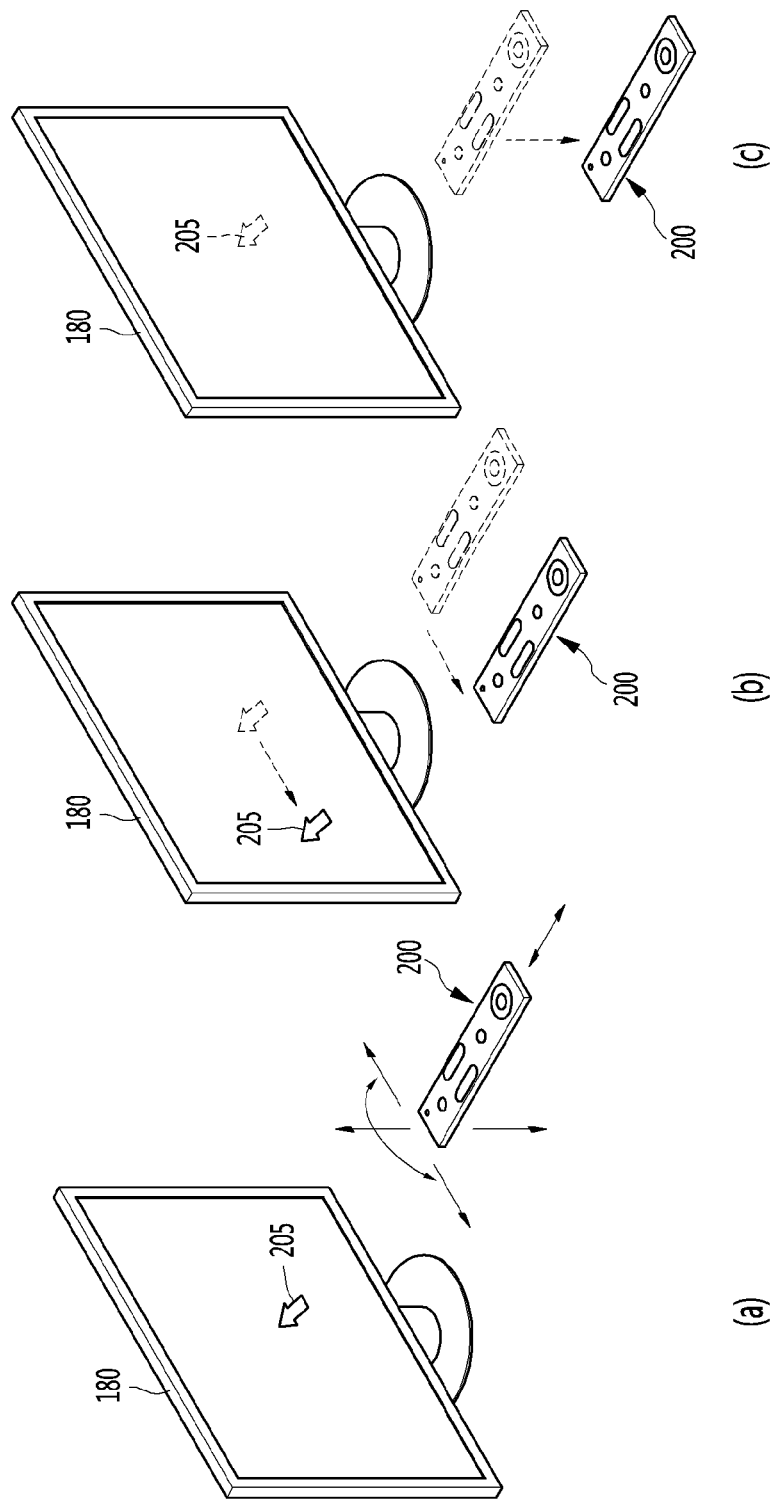
FIGS. 2 (a) to (c) illustrate embodiments of a method for controlling an operation of an image display device by using a remote controller.

FIGS. 2 (*a*) to (*c*) illustrate embodiments of a method for controlling an operation of an image display device by using a remote controller.

As illustrated in FIG. 2 (*a*), a pointer 205 corresponding to the remote controller 200 is exemplarily displayed on the display unit 180.

The user may move the remote controller 200 up, down, right, and left, or rotate it. The pointer 205 displayed on the display unit 180 of the image display device 100 may correspond to movements of the remote controller 200. As shown in the drawing, the remote controller 200 may be named as a spatial remote controller, since the corresponding pointer 205 is movably displayed in a 3D space according to the movement of the remote controller 200.

FIG. 2 (*b*) exemplarily illustrates that, when the user moves the remote controller 200 to the left, the pointer 205 displayed on the display unit 180 of the image display device 100 is correspondingly moved to the left.

Information on movement of the remote controller 200, which is detected through a sensor in the remote controller 200, is transmitted to the image display device 100. The image display device 100 may calculate coordinates of the pointer 205 from the information on the movement of the remote controller 200. The image display device 100 may display the pointer 205 in correspondence to the calculated coordinates.

FIG. 2 (c) exemplarily illustrates a case where the user moves the remote controller 200 away from the display unit 180 with a specific button in the remote controller 200 pressed. Accordingly, a selection area in the display unit 180, which corresponds to the pointer 205, may be zoomed in and displayed as enlarged.

On the other hand, when the user moves the remote controller 200 closer to the display unit 180, the selection area in the display unit 180, which corresponds to the pointer 205, may be zoomed out and displayed as contracted.

Furthermore, when the remote controller 200 is distant away from the display unit 180, the selection area may be zoomed out. When the remote controller 200 is closer to the display unit 180, the selection area may be zoomed in.

In addition, in a state where a specific button in the remote controller 200 is pressed, recognition of up, down, right, and left movements may be excluded. In other words, when the remote controller 200 is moved away from or closer to the display unit 180, the up, down, left, and right movements are not recognized and only forward and backward movements may be recognized. In a state where the specific button in the remote controller 200 is not pressed, only the pointer 205 is moved according to the up, down, left, and right movements of the remote controller 200.

On the other hand, a movement speed or a movement direction of the pointer 205 may correspond to that of the remote controller 200.

Furthermore, the pointer 205 described herein means an object displayed on the display unit 20 in correspondence to an operation of the remote controller 200. Accordingly, objects having various shapes may be adopted besides an arrow shape illustrated as the pointer 205 in the drawing. For example, it may be a concept including a point, a prompt, a thick outline, etc. In addition, the pointer 205 may be displayed in correspondence to a plurality of points such as a line or a surface as well as in correspondence to any one point of a horizontal axis and a vertical axis on the display unit 180.

Figure 3:
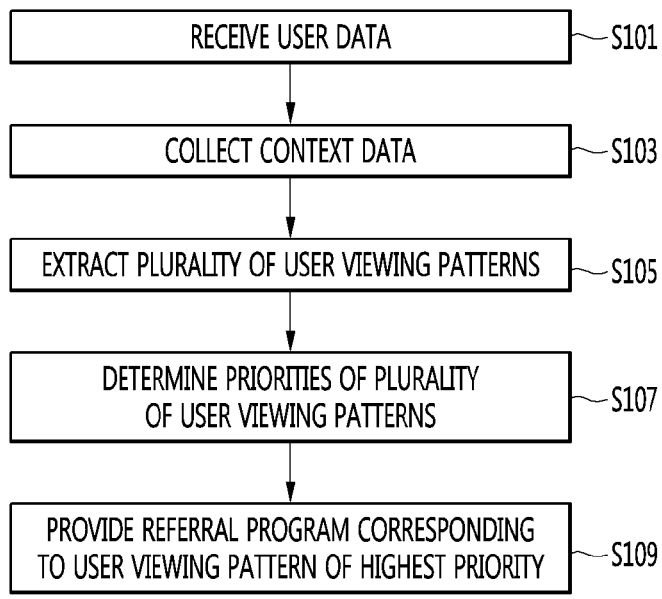
FIG. 3 is a flowchart illustrating an operation method of an image display device according to an embodiment.

FIG. 3 is a flowchart illustrating an operation method of an image display device according to an embodiment.

Referring to FIG. 3, the image display device 100 receives user data (operation S101) and collects context data (operation S103).

The user data means data including information on users. The user data may include, for example, not only user's face image captured through a camera, an age, and a gender, but also user identification (ID) pre-registered in the image display device 100, or information on pre-registered electronic devices, etc.

The user's face image may be received by the image display device 100 from a camera through the external device interface unit 135 or received from a camera (not illustrated) mounted in the image display device 100, but is not limited thereto.

Through a setting operation, the user may interact with the image display device 100 and register therein the user's face image, age, gender, user ID, or information on the electronic device such as a mobile terminal, etc.

The context data means data including information based on viewing situation of the user. The context data may be collected by the control unit 170 of the image display device 100 by using the broadcast reception unit 130 or may be collected from information viewed through the display unit 180 or the audio output unit 185, etc. However, the embodiment is not limited thereto.

For example, the context data may include viewing history information. The viewing history information may include EPG data such as channel information, genre information, content name, viewing start time, viewing end time, day information, and weather information. The EPG data may be included in an RF broadcast signal, which is received through the broadcast reception unit 130. The viewing start time and viewing end time may be set on the basis of time information included in the EPG data and a time while the user has substantially viewed.

In addition, the viewing history information may further include the number of viewing times and a total viewing time. The number of viewing times and the total viewing time may be collected by the control unit 170 on the basis of information stored in the storage unit 140.

Furthermore, the viewing history information may include, but is not limited to, at least one of real-time viewing history information and recording history information.

The control unit 170 may collect the viewing history information in a predetermined period, for example, in a week unit, a month unit, a quarter unit, or a year unit. At this point, the period may be set by the user.

Then, the control unit 170 extracts a plurality of user viewing patterns from the received user data and the collected context data (operation S105).

The user viewing pattern may mean viewing history information accumulated according to repetition of viewing for each user recognized from, for example, the user data.

For example, the user viewing pattern may mean the accumulated viewing history information for each individual user. In other words, the user viewing pattern may mean viewing history information periodically collected on the basis of a user ID allocated to each user.

For example, the image display device 100 may accumulate information on TV program content viewed by each of user A, user B, and user C for every specific time on specific day of the week and may extract a plurality of user viewing patterns, namely, respective user viewing patterns of user A, user B, and user C.

Alternatively, the user viewing pattern may mean viewing history information accumulated for each user group. The user group means there are two or more users, and the image display device 100 may recognize a user group, when receiving two or more users' face images. At this point, the user viewing pattern may mean viewing history information, which is periodically collected on the basis of the number of members of the user group and IDs of a plurality of users included in the user group.

For example, the image display device 100 may accumulate information on TV program content viewed by each of user A, user B, and user C for every specific time on specific day of the week and may extract a user viewing pattern of a user group including user A, user B, and user C.

In other words, when user A, user B, and user C, who are a plurality of family members, view a TV through the image display device 100, the image display device 100 may extract a plurality of user viewing patterns respectively corresponding to user A, user B, user C, user group 1 including user A and user B, user group 2 including user B and user C, user group 3 including user C and user A, and user group 4 including user A, user B, and user C.

Referring to Table 1, respective user viewing patterns of a plurality of users, and a user viewing pattern of a user group including the plurality of users will be described.

TABLE 1

| user | context | Mon | | Tue | | Wed |
| | | AM | PM | AM | PM | AM |
| --- | --- | --- | --- | --- | --- | --- |
| A | Channel program | CH5 | | | | |
| | Volume | 5 | | | | |
| | Text size | 11 | | | | |
| | Screen size | 16:9 | | | | |
| | Application | | | | | APP8 |
| A + B | Channel program | CH2 | CH3 | | | |
| | Volume | 8 | 8 | | | |
| | Text size | | | | | |
| | Screen size | 16:9 | 4:3 | | | |
| | Application | | | | | |
| A + B + C | Channel program | CH6 | | | | |
| | Volume | 12 | | | | |
| | Text size | 20 | | | | |
| | Screen size | 4:3 | | | | |
| | Application | | | | | APP1 |

The control unit 170 may extract a plurality of user viewing patterns by using the user data and context data as shown in Table 1. For example, the control unit 170 may extract a plurality of channel program viewing patterns or a plurality of application viewing patterns respectively corresponding to user A, user group 1 including user A and user B, and user group 4 including user A, user B, and user C.

In Table 1, context data such as a volume, text size, and screen size means device setting data, and will be described later with reference to a corresponding drawing.

On the other hand, the control unit 170 may recognize an end of a TV program content series from the collected context data or may extract a new user viewing pattern when recognizing a new TV program content series.

In addition, for a case of a user viewing pattern for an identical series of TV program content, although viewing of the corresponding TV program is delayed due to an unexpected news break or sports broadcasting, the control unit 170 recognizes that the extraction is performed at original play start and end times of the corresponding TV program content.

Then the control unit 170 determines priorities of a plurality of user viewing patterns (operation S107). It is necessary to determine the priorities of the plurality of user viewing patterns, when the plurality of user viewing patterns indicate different content at the same time on the same day.

For example, in Table 1, a plurality of channel program viewing patterns, which correspond to user A, user group 1 including user A and user B, and user group 4 including user A, user B, and user C, indicate different channels at morning on Monday. At this point, it is necessary that the control unit 170 determines priorities of the plurality of channel program viewing patterns.

The control unit 170 may determine priorities of a plurality of user viewing patterns on the basis of users or viewing context. The controller 170 may determine the priorities of the plurality of user viewing patterns on the basis of, but not limited to, the number of users or pre-determined users, or the number of content viewing times, a content viewing time, a pre-determined channel, pre-determined content, pre-determined content genre, pre-determined day of week, or pre-determined weather.

A method for determining priorities of a plurality of user viewing patterns on the basis of the number of users will be described with reference to the following Table 2.

TABLE 2

| | Mon | | |
| User | 6 AM | | 16 PM |
| --- | --- | --- | --- |
| CH1 | | | |
| CH2 | | | |
| CH3 | | | Program C5 |
| | | | Program C4 |
| CH4 | | | |
| CH5 | | Program B | |
| CH6 | Program A | | |

The control unit 170 may determine a user viewing pattern, which corresponds to a user group including the largest number of users, as having a highest priority. For example, the control unit 170 may determine, as having a highest priority, a channel program viewing pattern that corresponds to user group 4 having the largest number of users, from among the plurality of channel program viewing patterns extracted as shown in Table 1. Accordingly, the control unit 170 may determine, as a program of the highest priority, program A of channel 6 (CH 6) that is viewed by user group 4 at 6 on Monday, as shown in Table 2.

At this point, the control unit 170 may distinguishably indicate programs of the highest priority, which are determined according to the channel program viewing patterns corresponding to different users or different user groups, with different patterns or different colors.

Alternatively, the control unit 170 may also distinguishably indicate a referral program, which has been already viewed, from other referral programs, but the embodiment is not limited thereto.

Alternatively, the control unit 170 may determine, as having a highest priority, a user viewing pattern corresponding to a pre-determined user or a pre-determined user group, or may determine, as having a lowest priority, a user viewing pattern corresponding to a pre-determined user or a pre-determined user group, but the embodiment is not limited thereto.

Next, the control unit 170 provides a referral program corresponding to the user viewing pattern of the highest priority (operation S109).

In other words, the control unit 170 may recommend a user TV program content, web content, or application content, which corresponds to the user viewing pattern of the highest priority at a specific time on specific day of the week. A description about a program below may be applied to TV program content, web content, or application content, etc.

On the other hand, the control unit 170 may determine a device setting pattern of a highest priority on the basis of the foregoing device setting data and may recommend device setting corresponding to the device setting pattern of the highest priority, which will be described later in relation to a corresponding drawing.

In order to provide, to a user, a referral program corresponding to the user viewing pattern of the highest priority, the control unit 170 may store the referral program in the storage unit 140 or an external server, or may transmit referral program data to the user through the network interface unit 133.

For example, when the referral program is different from a program currently being viewed by the user, the control unit 170 may store the referral program in the storage unit 140 or the external server such as a cloud server. Then, when playback of the program currently being viewed by the user is ended, the control unit 170 displays a popup window on the display unit 180 to inform the user of the stored referral program or may play the stored referral program. At this point, the control unit 170 may play the stored referral program from the start by using a time shift function or may play by adjusting a playback speed of the referral program.

As another example, the control unit 170 may inform one or more users, who are known from the user viewing pattern of the highest priority, of a broadcast start of the referral program. At this point, the control unit 170 may inform the broadcast start of the referral program in a type of text message or may transmit the referral program data, to a mobile terminal, which has been registered as a user's electronic device. Alternatively, the control unit 170 may transmit the referral program data to another display device provided in a space where the user is recognized through a home network.

Alternatively, in order to provide the user the referral program corresponding to the user viewing pattern of the highest priority, the control unit 170 may notify the broadcast start of the referral program by using a picture in picture (PIP) screen on the display unit 180, or may display the referral program together with a program that is currently being played. For example, the control unit 170 may display the referral program on a first area and at the same time display the program currently being played in a PIP format on a second area, or may display the referral program on a second area in a PIP format and at the same time display the program currently being played on a first area, but the embodiment is not limited thereto.

Alternatively, the control unit 170 may display a user adaptive schedule on the display unit 180, but the embodiment is not limited thereto. For example, when power of the image display device is turned on or a user input is received, the control unit 170 may display, on the display unit 180, the user adaptive schedule to which the user viewing pattern of the highest priority, which is determined in step S107, is applied, or may transmit the user adaptive schedule data to a mobile terminal, which has been registered as a user's electronic device. The user adaptive schedule, to which the user viewing pattern of the highest schedule is applied, may be provided in a format of a time table as shown in Table 2, but the embodiment is not limited thereto.

Such a method for providing a referral program of the control unit 170 may be set by the user, but is not limited thereto.

Figure 4:
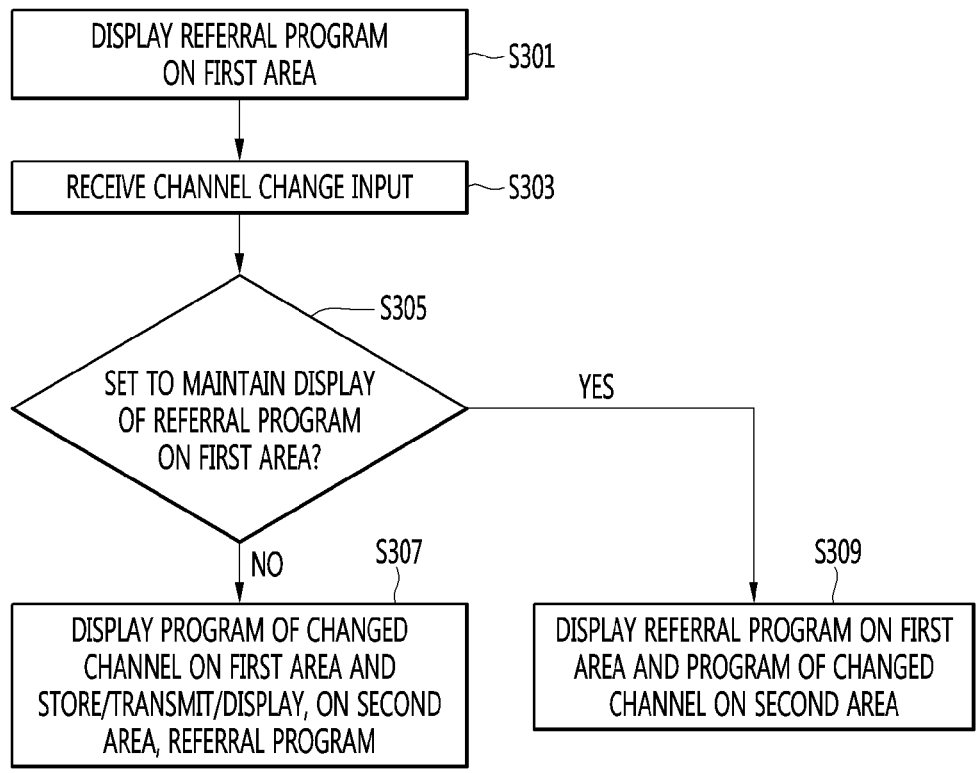
FIG. 4 is a flowchart illustrating a method for providing a referral program of an image display device according to a channel change input by a user according to an embodiment.

FIG. 4 is a flowchart illustrating a method for providing a referral program of an image display device according to a channel change input by a user according to an embodiment.

Referring to FIG. 4, the control unit 170 displays a referral program in a first area on the display unit 180 (operation S301). A display area of the display unit 180 may include the first area and a second area. The first area may be the entire are of the display unit 180 and the second area may a part of the entire area, but the embodiment is not limited thereto. The control unit 170 may display the referral program on the display unit 180 according to a user input, but the embodiment is not limited thereto. Accordingly, the user may view the referral program, which corresponds to a user viewing pattern of a highest priority among a plurality of user viewing patterns, through the display unit 180.

Then the control unit 170 receives a channel change input (operation S303). For example, the control unit 170 may receive a control signal of channel change from the remote controller 200. The channel change input may be a user input for displaying a different program from the referral program, which is being displayed in operation S301.

When the channel change input is received, the control unit 170 determines whether to maintain the display of the referral program in the first area (operation S305).

For example, when it is not set to maintain the display of the referral program in the first area on the display unit 180, the control unit 170 displays a channel program changed according to the user input for the channel change in the first area and at the same time stores, transmits, or displays the referral program in the second area (operation S307). At this point, in order to simultaneously display the referral program, the control unit 170 may display the changed channel program in the first area and at the same time display the referral program in the second area in a PIP format. In an embodiment, the first and second areas may be displayed in an overlapped manner. In another embodiment, the second area may overlap the first area and may be displayed transparently or translucently.

The control unit 170 may output a voice signal of the changed channel program to the audio output unit 185.

Descriptions about storage, transmittance, and simultaneous display of the referral program are the same as described above, and accordingly descriptions thereof will be omitted.

On the other hand, although a channel change input is received, when the referral program display is set to be maintained in the first area of the display unit 180, the control unit 170 continuously displays the referral program in the first area and at the same time displays a program of a channel according to the channel change input in the second area (operation S309). At this point, in order to simultaneously display the program of the changed channel, the control unit 170 may display the referral program in the first area and at the same time display the program of the changed channel in the second area in a PIP format. At this point, the control unit 170 may output a voice signal of the referral program to the audio output unit 185.

In this way, the image display device 100 may improve user convenience by providing a user a referral program, even when the remote controller 200 malfunctions during a display of the referral program.

FIG. 5 is a flowchart illustrating a method for providing a referral program according to user recognition by an image display device according to an embodiment.

Referring to FIG. 5, the control unit 170 recognizes a plurality of users (operation S501). For example, the control unit 170 may also recognize a user by using user's face images received from a camera.

Then, the control unit 170 determines whether the age of the recognized user is smaller than a pre-determined age (operation S503).

The control unit 170 may determine the user age by using information on the user age, which is interacted with the recognized user face images and registered, or information on user height input through the camera, etc.

The user may select an age pre-determined through a setting operation but the embodiment is not limited thereto. For example, the user may select the pre-determined age as 2.

Then when the age of each of the plurality of users n is greater than the pre-determined age, the control unit 170 provides a referral program corresponding to a user viewing pattern of the plurality of users n (operation S505).

On the other hand, when there is a user m who is younger than the pre-determined age among the plurality of users n, the control unit 170 excludes the user m who is younger than the pre-determined age from among the plurality of users n (operation S507) and provides a referral program corresponding to a user viewing pattern of the plurality of users (n-m) (operation S509).

For example, the control unit 170 may provide a referral program corresponding to a user viewing pattern of user A, user B, and user C, who are users from which user D whose age is smaller than 2 is excluded, from among user A, user B, user C, and user D, who are recognized through the camera.

In this way, the image display device 100 may exclude a specific user in recommending a program according to a user viewing pattern.

Alternatively, although not illustrated in the drawings, when the age of the recognized user is greater than the pre-determined age, the control unit 170 may also provide a referral program corresponding to a user viewing pattern of users whose ages are greater than the pre-determined age to determine a specific user as a highest priority criterion for program recommendation.

FIG. 6 is a flowchart illustrating a method for providing a referral program according to user recognition by an image display device according to an embodiment.

Referring to FIG. 6, the control unit 170 provides a referral program corresponding to a user viewing pattern of a plurality of users (e.g. user A, user B, and user C) (operation S701).

Then the control unit 170 displays, on the display unit 180, a referral program corresponding to the user viewing pattern of the plurality of users (e.g. user A, user B, and user C) according to a user selection (operation S703).

At this point, the control unit 170 may recognize the users through a camera, etc. As a result of the user recognition, when recognition fails for some of the plurality of users (e.g. user A, user B, and user C) having the user viewing pattern corresponding to the referral program, which is currently being displayed (operation S705), the control unit 170 separately provides the referral program to the recognition-failed users (operation S707).

For example, although the referral program corresponding to the user viewing pattern of the plurality of users (e.g. user A, user B, and user C) is being displayed, when user C is not recognized, the control unit 170 may separately provide the referral program, which is currently being displayed, to user C.

At this point, the case where user C is not recognized may include a case where user C has not been recognized from a start of the corresponding referral program or a case where user C had been recognized at the start of the corresponding referral program but thereafter has not been recognized till an end thereof. However the embodiment is not limited thereto.

For example, in order to separately provide a referral program, which is currently being displayed, to user C, the control unit 170 may notify a broadcast start of the referral program in a text message format or may transmit referral program data to a mobile terminal, which is registered as an electronic device of user C. As a result, user C may view the referral program in real time through a TV application, etc., of the mobile terminal.

Alternatively, in order to separately provide the referral program, which is currently being displayed, to user C, the control unit 170 may locate user C through a home network or GPS of a registered mobile terminal of user C and inform the mobile terminal registered as an electronic device of user C of a start of the referral program in a text message type. Alternatively, the control unit 170 may transmit the referral program data to another display device provided in a space where the user is recognized through the home network. At this point, the control unit 170 may inform the mobile terminal, which is registered as the electronic device of user C, of the start of the referral program or existence of another display device in the space where user C is present in a text message type. As a result, user C may view the referral program in real time through another fixed device other than the image display device 100 according to a selection.

Alternatively, in order to separately provide the referral program, the control unit 170 may store the entirety of or a part of the referral program in an external server such as a cloud server. At this point, the control unit 170 may inform the mobile terminal, which is registered as the electronic device of user C, of the storage of the referral program in a text message type. On the other hand, a part of the referral program stored in the external server may mean a program after a time when user. C is not recognized, but the embodiment is not limited thereto. In this way, the control unit 170 may separately provide a referral program, which is currently being displayed, to user C, even when user C cannot view the referral program in real time.

For another example, although a referral program corresponding to a user viewing pattern of the plurality of users (e.g. user A, user B, and user C) is being displayed, when user C is not recognized, the control unit 170 may communicate with the registered mobile terminal of user C. For example, when the control unit 170 connects the image display device 100 to the registered mobile terminal of user C, user A and user B, who are recognized, may share opinion about the referral program with user C, who is not recognized, through an social networking service (SNS) or a chatting window.

On the other hand, although the referral program corresponding to the user viewing pattern of the plurality of users (e.g. user A, user B, and user C) is being displayed, when user C is not recognized, the control unit 170 may inform non-presence of user C. For example, the control unit 170 may output information about the non-presence of user C and may lead user A and user B to view the referral program, which is currently being displayed, together with user C.

Figure 7:
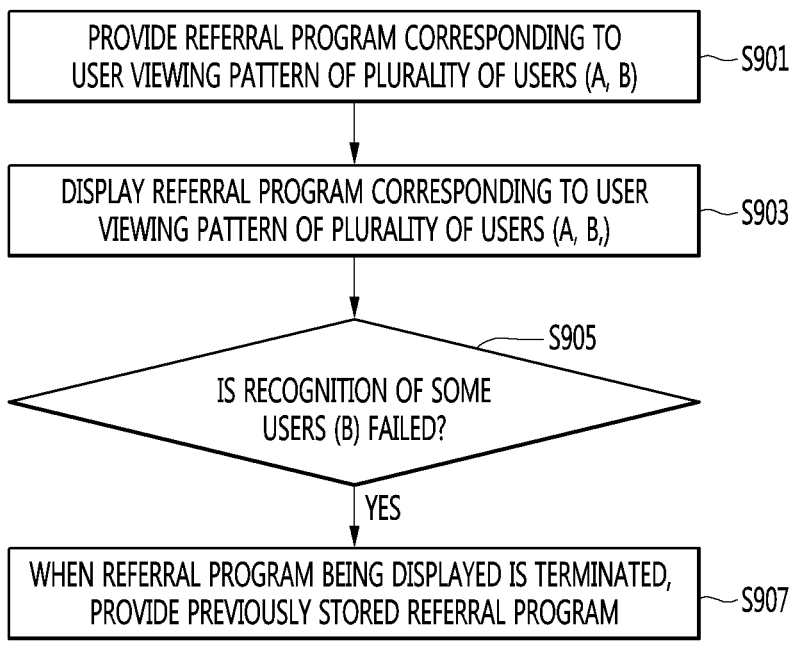
FIG. 7 is a flowchart illustrating a method for providing a referral program according to user recognition by an image display device according to an embodiment.

FIG. 7 is a flowchart illustrating a method for providing a referral program according to user recognition by an image display device according to an embodiment.

Referring to FIG. 7, the control unit 170 provides a referral program corresponding to a user viewing pattern of a plurality of users (e.g. user A and user B) (operation S901), and displays the referral program, which corresponds to the user viewing pattern of the plurality of users (e.g. user A and user B) on the display unit 180 according to a user selection (operation S903).

At this point, the control unit 170 may recognize the users through a camera, etc. As a user recognition result, in a case where recognition has ever been failed for some users among the plurality of users (e.g. user A and user B) having the user viewing pattern, which corresponds to the referral program being currently displayed (operation S905), when the referral program currently being displayed is ended, the control unit 170 provides again a referral program, which is previously stored (operation S907).

For example, when recognition has ever been failed for user B among the plurality of users (e.g. user A and user B) having the user viewing pattern, which corresponds to the referral program being currently displayed, the control unit

170 may provide a notification about the referral program, which user B did not view, through the display unit 180 at the time when the user B is recognized. For example, when user B selects to view a drama, the control unit 170 may provide a notification about an episode, which user B has not viewed among a series of the drama selected by user B.

The notification about the referral program, which user B has not viewed, may be displayed in a popup window type or in a user adaptive schedule type as shown in Table 2.

For example, like Table 2, the control unit 170 may display a user adaptive schedule in which program C of channel 3, which user group 1 including user A and user B views at 16 on Monday, is determined as a program having a highest priority.

At this point, when the control unit 170 has ever failed to recognize user B at the time of displaying episode 4 of program C, which is one of referral programs, the control unit 170 may indicate, on the user adaptive schedule screen, episode 5 (i.e. program C5) of program C together with episode 4 (i.e. program C4) of program C at 16 on Monday. At this point, the indications of episode 5 (i.e. program C5) of program C and episode 4 (i.e. program C4) of program C may be distinguished from each other.

At this point, according to a user selection, the control unit 170 may play an episode, which user B has not viewed, to display on the display unit 180. For example, the user may select episode 4 of program C on the user adaptive schedule screen displayed on the display unit 180 by using the remote controller 200, but the embodiment is not limited thereto. In addition, according to a user selection, the control unit 170 may play an episode, which the user B has not viewed, to display the episode on the display unit 180 before and after playing an episode, which the user B currently selects, but the embodiment is not limited thereto.

Alternatively, although not illustrated in the drawing, when episode 4 of program C, which the user has not viewed, is played from at 15:30 on Monday, the control unit 170 may provide episode 5 (i.e. program C5) of program C, which is a referral program, at 16, and may continuously play episode 4 (i.e. program C4) of program C or play episode 5 (i.e. program C5) of program C according to user selection. At this point, according to the user selection, when episode 4 (i.e. program C4) of program C is continuously played, the control unit 170 may store episode 5 (i.e. program C5) of program C, and when playback of episode 4 (i.e. program C4) of program C is completed, may play episode 5 (i.e. program C5) of program C from the start. However the embodiment is not limited thereto.

Figure 8:
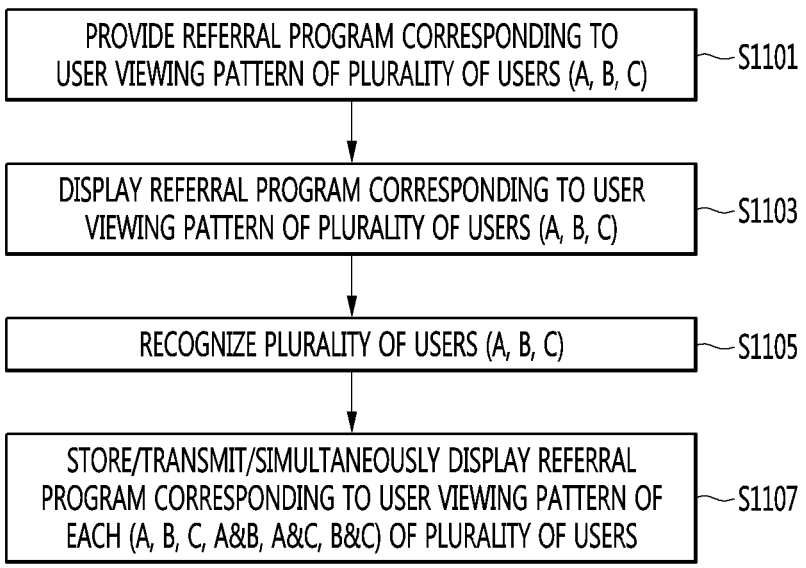
FIG. 8 is a flowchart illustrating a method for providing a referral program according to user recognition by an image display device according to an embodiment.

FIG. 8 is a flowchart illustrating a method for providing a referral program according to user recognition by an image display device according to an embodiment.

Referring to FIG. 8, the control unit 170 provides a referral program corresponding to a user viewing pattern of a plurality of users (e.g. user A, user B, and user C) (operation S1101). For example, the control unit 170 may provide program A of channel 6 (i.e. CH 6), which user group 4 (user A, user B, and user C) views at 6 on Monday, as a referral program.

Then the control unit 170 displays, on the display unit 180, the referral program corresponding to a user viewing pattern of the plurality of users (e.g. user A, user B, and user C) according to a user selection (operation S1103). For example, the control unit 170 may display program A on the display unit 180 according to the user selection.

Then, when the plurality of users (e.g. user A, user B, and user C) are recognized through a camera, etc. (operation S1105), the control unit 170 separately provides, to the plurality of users, by storing, transmitting, or simultaneously displaying referral programs or information thereon, which correspond to respective user viewing patterns of the plurality of users (operation S1107).

For example, at 6 on Monday, the control unit 170 displays program A on the display unit 180, while storing, in the storage unit 140 or external server, referral programs respectively corresponding to user A, user B, user C, user group 1 including user A and user B, user group 2 including user B and the user C, and user group 3 including user C and user A.

At this point, the control unit 170 may transmit, to, for example, a mobile terminal registered as an electronic device of user A, information on referral programs respectively corresponding to user viewing patterns of user A, user group 1 and user group 3.

Alternatively, the control unit 170 displays program A in a first area on the display unit 180, while displaying, in a second area in a PIP format, one of referral programs respectively corresponding to user viewing patterns of user A, user B, user C, user group 1 including user A and user B, user group 2 including user B and user C, and user group 3 including user C and user A.

Figure 9:
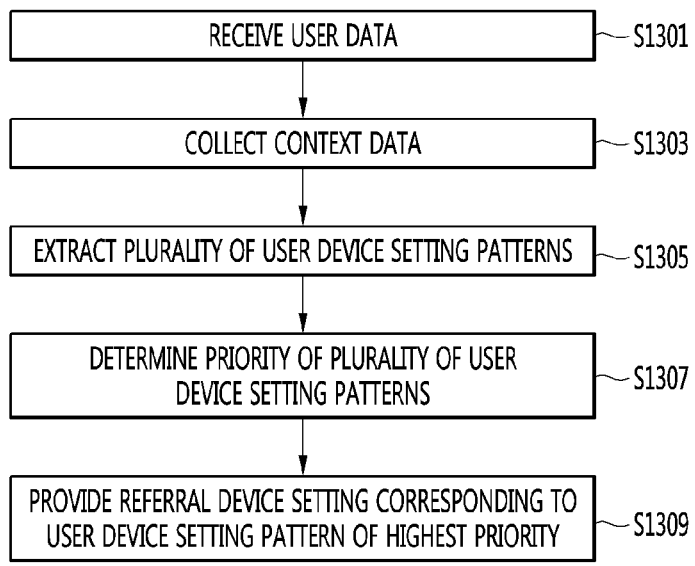
FIG. 9 is a flowchart illustrating an operation method of an image display device according to an embodiment.

FIG. 9 is a flowchart illustrating an operation method of an image display device according to an embodiment.

Referring to FIG. 9, the image display device 100 receives user data (operation S1301) and collects context data (operation S1303). The user data is similar to the above-described.

The context data means data including information based on user's viewing context, for example, an output volume of the audio output unit 185 selected by a user, a text size displayed on the display unit 180, and device setting information such as a screen size like an aspect ratio.

Then the control unit 170 extracts a plurality of user device setting patterns from the received user data and the collected context data (operation S1305).

The user device setting pattern may mean, for example, device setting information accumulated according to repetition of viewing for each user recognized from the user data.

For example, the user device setting pattern may mean device setting information accumulated for an individual user or a user group. In other words, the user device setting pattern may mean device setting information, which is periodically collected on the basis of a user ID allocated to each user, or is periodically collected on the basis of the number of members of a user group and each user ID of a plurality of users included in the user group.

For example, the image display device 100 may extract a user device setting pattern that a TV volume is set to 14 when the user A views TV program content at a specific time on a specific day of the week, and may extract a user device setting pattern that a TV volume is set to 19 or 20 when the user A, the user B, and the user C view TV program content.

Then the control unit 170 determines priorities of a plurality of user device setting patterns (operation S1307). It is necessary to determine the priorities of the plurality of user device setting patterns, when the plurality of user device setting patterns indicate different device settings at the same time on the same day.

The control unit 170 may determine the priorities of the plurality of user device setting patterns on the basis of users or viewing context. The control unit 170 may determine the priorities of the plurality of user device setting patterns on the basis of, but not limited to, the number of users or pre-determined users, or the number of content viewing times, a content viewing time, a pre-determined channel, pre-determined content, pre-determined content genre, predetermined day of the week, or pre-determined weather. However the embodiment is not limited thereto.

For example, the control unit 170 may determine a user device setting pattern, which corresponds to a user group including the largest number of users, as having a highest priority. At this point, a user device setting pattern, which corresponds to user group 4 including user A, user B, and user C, may be determined as having the highest priority.

Alternatively, the control unit 170 may determine a user device setting pattern, which corresponds to a pre-determined user, as having the highest priority. At this point, a user device setting pattern, which corresponds to user A, may be determined as having the highest priority.

Alternatively, the control unit 170 may determine, as having the highest priority, a user device setting pattern corresponding to a pre-determined user or a pre-determined user group, or may determine, as having a lowest priority, a user device setting pattern corresponding to a pre-determined user or a pre-determined user group, but the embodiment is not limited thereto.

Next, the control unit 170 provides a referral device setting corresponding to a user device setting pattern of the highest priority (operation S1309).

In other words, the control unit 170 may recommend a user with a device setting which corresponds to a user device setting pattern of the highest priority when playback of a certain TV program content at a specific time on specific day of the week. The method for providing a referral device setting is identical to the above-described method for storing, transmitting, and simultaneously displaying referral program, and will be omitted below.

Figure 10:
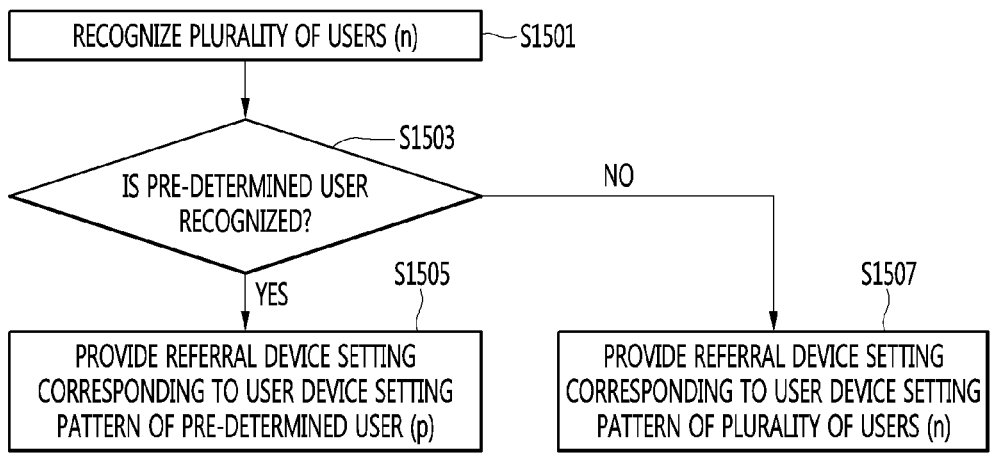
FIG. 10 is a flowchart illustrating a method for providing a referral device setting according to user recognition by an image display device according to an embodiment.

FIG. 10 is a flowchart illustrating a method for providing referral device setting according to user recognition by an image display device according to an embodiment.

Referring to FIG. 10, the control unit 170 recognizes a plurality of users (operation S1501).

Then when a pre-determined user is recognized (operation S1503), the control unit 170 provide a referral device setting, which corresponds to a user device setting pattern of the pre-determined user p (operation S1505).

At this point, the pre-determined user p may mean, but is not limited to, a user who satisfies a pre-determined condition such as a user age, or a specific person previously determined by a user selection.

On the other hand, when a pre-determined user is not recognized (operation S1503), the control unit 170 provides the referral device setting, which corresponds to the user device setting pattern of the plurality of users n recognized in operation S1501 (operation S1505).

An operation method of an image display device according to embodiments can also be embodied as computer readable codes on a computer readable recording medium. Examples of the computer readable recording medium include read-only memory (ROM), random-access memory (RAM), CD-ROMs, magnetic tapes, floppy disks, and optical data storage devices, and carrier waves (such as data transmission through the Internet).

The computer readable recording medium can also be distributed over network coupled computer systems so that the computer readable code is stored and executed in a distributed fashion. Also, functional programs, codes, and code segments for accomplishing an operation method of an image display device according to embodiments can be easily construed by programmers skilled in the art to which the present invention pertains.

The above-disclosed subject matter is to be considered illustrative, and not restrictive, and the appended claims are intended to cover all such modifications, enhancements, and other embodiments, which fall within the true spirit and scope of the inventive concept. Thus, to the maximum extent allowed by law, the scope of the inventive concept is to be determined by the broadest permissible interpretation of the following claims and their equivalents, and shall not be restricted or limited by the foregoing detailed description.

The invention claimed is:

1. An operation method of an image display device used by a plurality of users, the operation method comprising:
receiving, via a camera or a user interface, user data of a user and user data of at least one user group;
collecting, by a controller, viewing history information for the user and viewing history information for the at least one user group;
extracting, by the controller, a plurality of user viewing patterns by using the user data and the user viewing history information;
providing, by the controller, a referral program corresponding to a user viewing pattern of a highest priority on a basis of priorities of the plurality of extracted user viewing patterns;
displaying, via a display, a first referral program corresponding to a first user viewing pattern, when the user viewing pattern of the highest priority corresponds to the first user viewing pattern extracted by using user data of a first user group and viewing history information on the first user group;
recognizing, by the controller, a user; and
as a recognition result, when at least one user among users comprised in the first user group is not recognized, separately providing, by the controller, the first referral program to the user who is not recognized,
wherein the separately providing the first referral program comprises storing the first referral program in a storage inside the image display device or an external server, or transmitting information on the first referral program or first referral program data to a pre-registered terminal of the user who is not recognized.

2. The operation method according to claim 1, wherein the priorities of the plurality of user viewing patterns are determined on a basis of a number of users or a pre-determined user.

3. The operation method according to claim 1, wherein the providing of the referral program comprises storing the referral program in the storage or in the external server, transmitting information on the referral program or referral program data to a pre-registered terminal of at least one user comprised in a user group of the user viewing pattern of the highest priority, or displaying the information on the referral program on the display of the image display device.

4. The operation method according to claim 1, further comprising:
displaying, via the display, the referral program on a first area of the image display device;
receiving, via the user interface, a user input for changing a channel; and
displaying a program of a channel changed according to the user input and separately providing the referral program, when a presentation of the referral program is not determined to be maintained on the first area, and displaying the program of the channel changed according to the user input on a second area of the image display device and displaying the referral program on the first area, when the presentation of the referral program is set to be maintained on the first area.

5. The operation method according to claim 4, wherein the separately providing of the referral program comprises storing the referral program in the storage or in the external server, transmitting information on the referral program or referral program data to a pre-registered terminal of at least one user comprised in a user group of the user viewing pattern of the highest priority, or displaying the referral program on the second area.

6. The operation method according to claim 1, wherein the providing the referral program corresponding to the user viewing pattern of the highest priority comprises:
 recognizing the plurality of users; and
 when an age of any one user of the plurality of recognized users is smaller than a pre-determined age, providing a referral program corresponding to a user viewing pattern of a plurality of the recognized users from which the user whose age is smaller than the pre-determined age is excluded.

7. The operation method according to claim 1, further comprising:
 displaying, via the display, again the stored first referral program for separate provision to the user who is not recognized when all the users comprised in the first user group are recognized.

8. The operation method of claim 1, further comprising:
 displaying, via the display, a second referral program corresponding to a second user viewing pattern, when the user viewing pattern of the highest priority corresponds to the second user viewing pattern extracted by using user data of a second user group and viewing history information on the second user group;
 recognizing, by the controller, a user; and
 as a recognition result, separately providing, by the controller, referral programs corresponding to user viewing patterns remaining by excluding the user viewing pattern of the highest priority from among the plurality of user viewing patterns.

9. An image display device used by a plurality of users, the image display device comprising:
 a camera capturing a user image;
 a user interface; and
 a controller configured to receive user data of a user and user data of at least one user group from the camera and the user interface, collect viewing history information for the user and viewing history information for the at least one user group, extract a plurality of user viewing patterns by using the user data and the user viewing history information, and provide a referral program corresponding to a user viewing pattern of a highest priority among the plurality of user viewing patterns,
 wherein the user interface is configured to receive a user ID, a user age, a user gender, and information on another terminal possessed by the user,
 wherein the controller is further configured to:
 display a first referral program corresponding to a first user viewing pattern, when the user viewing pattern of the highest priority corresponds to the first user viewing pattern extracted by using user data of a first user group and viewing history information on the first user group,
 recognize a user, and
 as a recognition result, when at least one user among users comprised in the first user group is not recognized, separately provide the first referral program to the user who is not recognized, and
 wherein the controller is further configured to separately provide the first referral program by storing the first referral program in a storage inside the image display device or an external server, or transmitting information on the first referral program or first referral program data to a pre-registered terminal of the user who is not recognized.

10. The image display device according to claim 9, wherein the controller is configured to determine a user viewing pattern of a user group of which a number of users is greatest as the user viewing pattern of the highest priority.

11. The image display device according to claim 9, wherein the controller is configured to determine a user viewing pattern of a pre-determined user or a pre-determined user group as the user viewing pattern of the highest priority.

12. The image display device according to claim 11, wherein the controller is configured to determine the pre-determined user or the pre-determined user group according to a user selection input received through the user interface.

13. The image display device according to claim 9, further comprising:
 a network interface,
 wherein the controller is configured to transmit information on the referral program or referral program data to the another terminal of at least one user comprised in a user group of the user viewing pattern of the highest priority by using the network interface.

14. An image display device used by a plurality of users, the image display device comprising:
 a camera capturing a user image;
 a user interface; and
 a controller configured to receive user data of a user and user data of at least one user group from the camera and the user interface, collect viewing history information for the user and viewing history information for the at least one user group, extract a plurality of user viewing patterns by using the user data and the user viewing history information, and provide a referral program corresponding to a user viewing pattern of a highest priority among the plurality of user viewing patterns,
 wherein the controller is further configured to:
 display a first referral program corresponding to a first user viewing pattern, when the user viewing pattern of the highest priority corresponds to the first user viewing pattern extracted by using user data of a first user group and viewing history information on the first user group,
 recognize a user, and
 as a recognition result, separately provide referral programs corresponding to user viewing patterns remaining by excluding the user viewing pattern of the highest priority from among the plurality of user viewing patterns.

\* \* \* \* \*